UNITED STATES PATENT OFFICE.

FRANK A. JOHNSON, OF SALISBURY, MASSACHUSETTS, ASSIGNOR TO JOHNSON EDUCATOR FOOD COMPANY, OF BOSTON, MASSACHUSETTS, A CORPORATION OF MASSACHUSETTS.

PROCESS OF MAKING CRACKERS.

No. 882,006.  Specification of Letters Patent.  Patented March 17, 1908.

Application filed March 21, 1907. Serial No. 363,533.

*To all whom it may concern:*

Be it known that I, FRANK A. JOHNSON, citizen of the United States, residing at Salisbury, in the county of Essex and State of Massachusetts, have invented a certain new and useful Improvement in Processes of Making Crackers, of which the following is a specification.

The invention relates to a new process of making crackers. In the ordinary process of making crackers, if butter is employed in the composition of the cracker, it is incorporated in to the mixture before the cracker is baked.

The object of the present invention is to provide as a commercial article a cracker having the oil of butter combined therewith and treated in such a manner as to give a toasted effect to the cracker without being oily to the touch when the cracker is cold.

In the manufacture of my improved cracker, I use entire wheat flour and mix it with water, forming a dough in a manner which will be well understood by cracker makers. The dough is then passed through the cracker machine to stamp out the cracker and as the cracker passes from the machine, it is sprinkled with salt. The cracker is then placed in the oven and baked. After being baked, the cracker is removed from the oven and while still in its extremely heated condition while on the peel with which the crackers are removed from the oven, there is applied to the surface of the cracker a butter oil which is obtained by melting butter and separating the oil from the residue.

The process of reducing pure butter to butter oil is as follows: Pure butter so called contains more or less water. The pure food law so termed allows 15$\frac{9}{100}$ water in pure butter as I understand it. In the process of reducing pure butter to butter oil, in carrying out my invention, the water in the butter is evaporated in a steam chest. After the water is evaporated, the salt and casein are separated by a straining process, leaving a pure butter oil which is then applied in its very hot state to the hot surface of the cracker while still in its originally heated condition when first baked. By applying the butter oil in the above manner, it will be absorbed by the cracker, so that when the cracker is cooled, it will be dry, both on the exterior and throughout. The application of the butter oil to the cracker while in this extremely hot state after being freshly baked will give a toasted effect to the cracker. By reason of its freedom from any oily or greasy effect on the surface when cooled, the cracker can be handled and packed without greasing the fingers, and a peculiar flavor is imparted to the cracker as well as a peculiar toasted appearance, due to the butter oil being applied in the manner described.

What I claim is:

The process of making crackers consisting of mixing entire wheat flour and water to form a dough, stamping the cracker from the dough and sprinkling salt upon the surface of the stamped out cracker before being baked, then baking the cracker and while the freshly baked cracker is still in its highly heated condition before being allowed to cool, applying to the surface of the cracker a pure, hot melted butter oil from which all casein, salt and water have been removed, said butter oil being applied to the surface of the cracker in such proportion as to be wholly absorbed by the cracker while still in its highly heated condition.

In testimony whereof I affix my signature, in presence of two witnesses.

FRANK A. JOHNSON.

Witnesses:
WILLIAM R. HALL,
RHODA MACMURRAY.